United States Patent [19]

Stueber

[11] 4,164,129
[45] Aug. 14, 1979

[54] VARIABLE MODE FREEZER

[76] Inventor: Harry K. Stueber, P.O. Box 421, Gambrills, Md. 21054

[21] Appl. No.: 829,882

[22] Filed: Sep. 1, 1977

[51] Int. Cl.² ............... F25B 27/00; F25D 13/06
[52] U.S. Cl. ..................... 62/326; 62/302; 62/303; 62/380; 62/381
[58] Field of Search ............ 62/302, 303, 381, 62, 62/57, 240, 326

[56] References Cited

U.S. PATENT DOCUMENTS

| | | | |
|---|---|---|---|
| 3,058,320 | 10/1962 | Foster et al. | 62/302 |
| 3,169,381 | 2/1965 | Persson | 62/57 |
| 3,226,947 | 1/1966 | Wakatsuki et al. | 62/303 |
| 3,269,142 | 8/1966 | DeMola et al. | 62/381 |
| 3,393,532 | 7/1968 | Khoylian | 62/63 |
| 3,412,476 | 11/1968 | Astrom | 62/381 |
| 3,477,242 | 11/1969 | Lamb et al. | 62/57 |
| 3,733,848 | 5/1973 | Duron et al. | 62/381 |
| 3,769,807 | 11/1973 | Foster | 62/63 |
| 3,886,762 | 6/1975 | Rothstein et al. | 62/57 |

Primary Examiner—Ronald C. Capossela
Attorney, Agent, or Firm—James J. Brown

[57] ABSTRACT

A freezing unit is described having plural compartments on upper and lower levels for accommodating air moving means, refrigeration coils and conveyors for receiving and maintaining the articles to be frozen in the unit. The refrigeration coils are disposed in a compartment on the lower level with compartments on either side. The air moving means is disposed over one of the side compartments and the conveyors can be disposed either over the other side compartment, adjacent to it or within it. This arrangement of components permits ease of access and allows plural conveyors to be deployed and used together or alternatively in their respective compartments. Partitions with variable closures are also provided for directing the flow of refrigerated air to the desired compartments.

10 Claims, 6 Drawing Figures

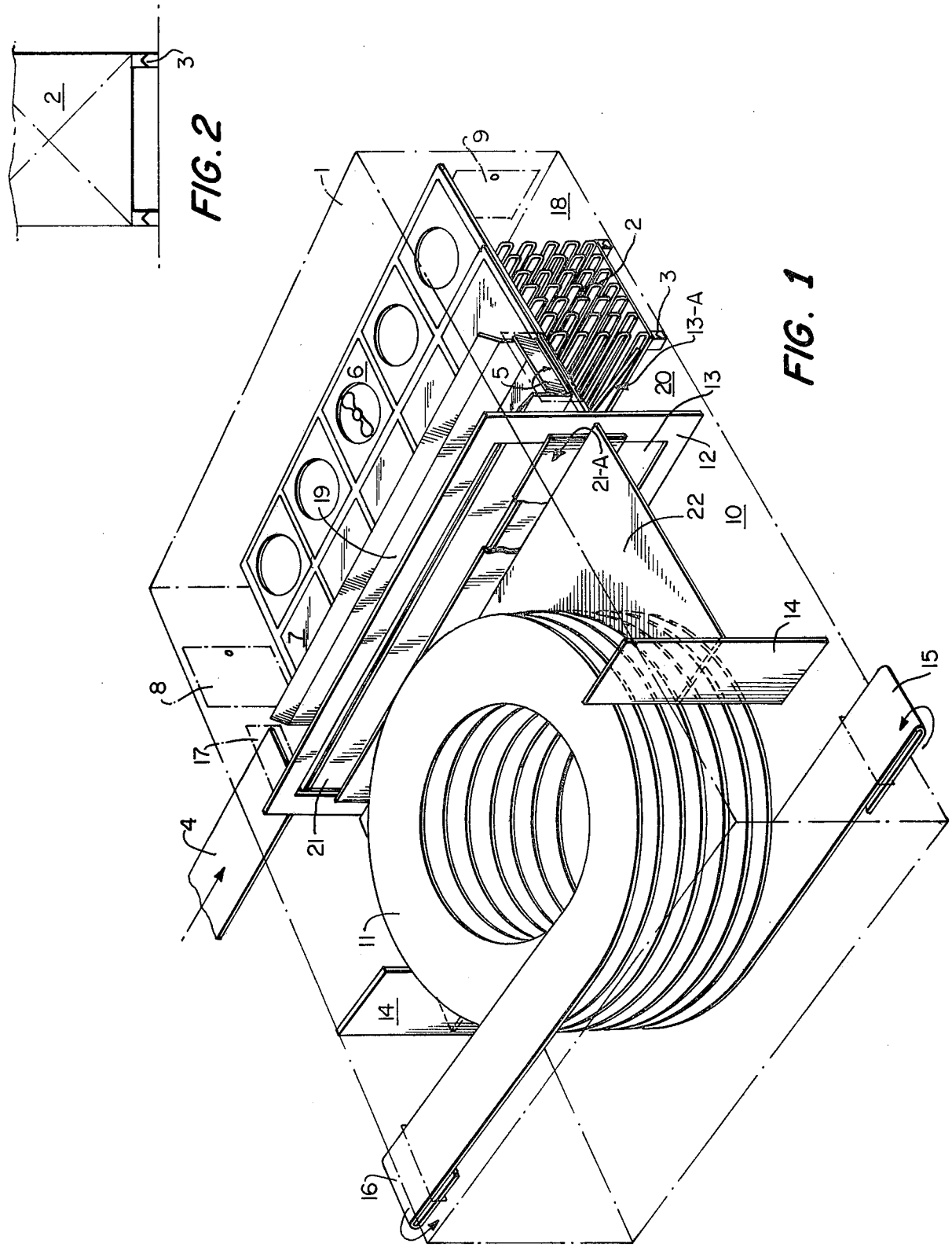

VARIABLE MODE FREEZER

The present invention relates to a device and method for freezing articles, such as a wide variety of foods, in an efficient, economical and hygenically accpetable manner. More particularly the present invention relates to a device and method which is readily adapted to the various different modes of operation required to freeze rapidly a wide variety of food products including fruit, vegetables, fish and shellfish, poultry, meat products and potatoes, as well as various convenience or processed foods.

BACKGROUND OF THE INVENTION

Particularly throughout the industralized world, frozen foods have now become commonly accepted and encompass a wide variety of different types of food, many of which require different freezing techniques. This worldwide expansion of the present food industry and the spectrum of foods which are now marketed in a frozen state has resulted in a great diversity and sophistication of freezing methods and in-line production equipment.

Regardless however of the type of frozen foods involved or the particular technique or equipment employed in preparing the frozen foods, it is generally recognized that the food should be frozen as quickly as possible in order to preserve the natural taste and appearance of the food. To accomplish this rapid freezing of the food product, however, requires different procedures and devices depending upon the type of foods being frozen.

For example, in one technique the prepared food product is spread on a metal mesh belt through which subfreezing air is passed to make intimate contact with the food product. In another method used to accomplish the same result, the food product is spread on trays which are placed in tiers on a trolley which is then placed in a refrigerating room and blasts of cold air directed over the surface of the food. In yet another commonly practiced method, a fluidized bed is employed in which a current of cold air passes up through a belt or conveyor tray carrying the food particles thereby producing a moving fluidized bed in which the food particles are slightly suspended in the air current above the tray or belt while they are frozen.

The particular use, however, of any of these systems will largely depend upon the type of foods being treated. For example, it will be appreciated that large pieces of meat, poultry or fish are not suitably frozen using the fluidized bed technique which is suitable however for small items such as peas or diced vegetables. It will further be appreciated that heretofore each of the various freezing techniques employed to freeze different kinds of foods has required an entirely different and expensive piece of equipment. Thus, the manufacturer of frozen foods must assemble at considerable expense a wide variety of pieces of equipment for freezing the different kinds of food which he processes despite the fact that some of this large and expensive equipment may only be used for a short time due to the brief growing season as in the case of vegetables, fruits and berries.

Freezing equipment heretofore employed in the frozen food industry, in addition to lacking desirable diversity, has also had the disadvantage that it has been awkward and inconvenient to clean and maintain. This has become an increasingly serious problem in view of more stringent hygenic standards required by government agencies.

It is therefore an object of the present invention to provide a new and improved method and apparatus for freezing a wide variety of foods which heretofore required different freezing techniques and equipment.

It is further object of the present invention to provide a food freezing device which permits the alternative use of several different types of food conveyor systems while utilizing a common air handling and refrigeration means.

It is still a further object of the present invention to provide a food freezing device in which different types of air handling units can be readily interchanged.

Still a further object of the present invention is to provide a food freezing device and method in which both the air handling and refrigeration units can be readily inspected, cleaned, removed or interchanged with other units.

Still a further object of the present invention is to provide a food freezer having improved air flow characteristics which can be readily altered depending upon processing requirements.

STATEMENT OF THE INVENTION

The above described objectives are achieved according to the present invention by providing a system and an apparatus having plural compartments on upper and lower levels in which the three principal components consisting of the air moving means, the refrigeration means and the food conveyor are each separately disposed in their own chamber and the three chambers are aligned so that the refrigeration means is disposed on the lower level with compartments on either side, the air moving means is disposed on the upper level over one of the compartments and the food conveyor is disposed either adjacent to or in the second compartment in a position to receive refrigerated air from the refrigeration means.

Thus, according to the present invention, the air moving, refrigeration and conveyor components of the invention can easily and quickly be varied according to needs by substituting or interchanging the particular type of component or components employed. For example, the present invention can conveniently utilize any of the four principal conveying means which are employed in in-line production freezers: fluidized trays, trays and trolleys, straight-through belt conveyors, spiral conveyors. With regard to the refrigeration means, either cryogenic gases or expaned refrigerants can be used according to the present invention. With respect to the air moving component, either blowers, which are more advantageously used to maintain fluidized beds, or fans, which have the advantage of being reversible can be interchangeably employed.

The present invention will, however, be more fully understood in its various embodiments by having reference to the accompanying drawings.

BRIEF DESCRIPTION OF THE DRAWINGS

FIG. 1 is a schematic representation of one embodiment of the present invention wherein the entire freezer unit is shown in perspective.

FIG. 2 is a schematic front end view of the removable refrigeration unit of the present invention.

DETAILED DESCRIPTION OF THE INVENTION

Figure 4:
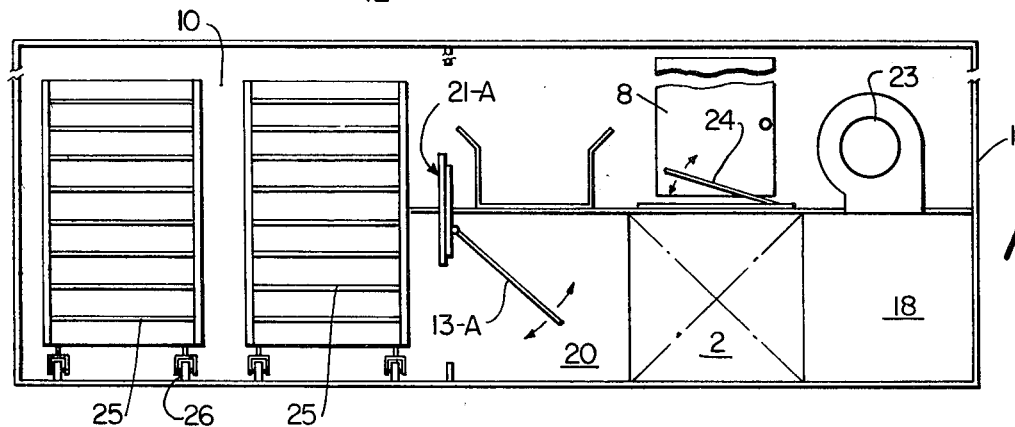
FIG. 4 is another schematic front end view of an embodiment of the present invention wherein tiered trays are employed in place of the spiral conveyor of FIGS. 1 and 3.
Figure 5:
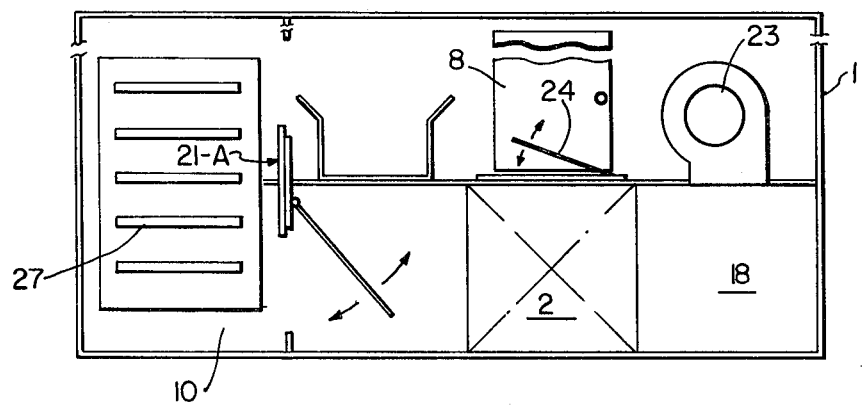
FIG. 5 is a schematic front end view of yet another embodiment of the present invention wherein multi-level conveyor belts are employed in place of the tiered trolley or spiral conveyor of FIGS. 1, 3, and 4.

Directing attention first of all to FIGS. 1 and 2, the outside housing of the entire freezing unit depicted therein is designated 1 and shown in broken line. Air moving means, which may be either blowers or fans, are shown at 6 disposed immediately above the passageway 18 having a door 9 for access thereto. Located adjacent the passageway 18 are refrigeration coils 2 which are mounted on runners 3 to facilitate their removal for cleaning, inspection, replacement or other service. A passageway 7 is located immediately above the refrigeration coils and is accessible by doorway 8. The passageway 7 also provides access to the air moving means 6, the food conveyor 19 located to the side of the passageway 7 and the refrigeration coils 2 through hinged or removable floor panels 24 (as shown in FIGS. 4 and 5). Food or other articles which have been prepared for freezing are delivered to the device, in one of the embodiments depicted, by means of conveyor 4 through the window 17. The food conveyor 19 consists of a channel of u-shaped cross sections with sides and a mesh or perforated bottom which permits an upward flow of air therethrough from the passageway 20 adjacent the refrigeration coil 2. This upward flow of air causes a slight elevation in the food particles which are introduced from the conveyor 4 to produce a fluidized bed. The force of newly delivered food through the window 17 is sufficient to propel the food particles in their fluidized state along the trough 19 until they reach the terminous thereof at which point they are removed from the unit. A small swinging door is provided at the terminous of the trough 19 to cause the food particles to back up to a predetermined depth behind it. Thus, this swinging door, which may be spring loaded, functions as a weir in the fluidized bed. It will be appreciated that this embodiment of the present invention functions by directing a stream of air from the fans or blowers 6 through the passageway 18 and across the cooling coils 2 into the passage 20 from which the blast of refrigerated air proceeds upward through the bottom of the trough 19 to produce a moving fluidized bed of food particles which are frozen during the period of their transit through the trough 19.

As heretofore noted, however, the present invention has the important advantage that it can be utilized in alternate modes of operation. Still with reference to FIG. 1, a partition 12 is provided adjacent the compartment 20 and the trough 19 having a lower window 13 and an upper window 21 both of which can be partially or fully closed by a suitable sliding or hinged panel as desired. In addition, baffles are provided at 14 and 22 to channel the flow of air through the compartment 10 which is separated from the remainder of the device by the heretofore described vertical partition 12. A spiral endless conveyor of conventional design is shown at 11. Food is introduced onto the conveyor at 15 and passes in a spiral motion along the conveyor belt until it exits the device at 16. In this embodiment the bottom of the trough 19 is closed off by doors or other suitable closures and the windows 13 and 21 open to permit the flow of cold air therethrough. Thus, the blast of refrigerated air coming from the coil 2 is directed through window 13 into the compartment 10 and across the multiple spiral layers of the conveyor 11 where it accomplishes the freezing of the foods. The air, which flows in a generally upward direction is then recirculated through the window 21 back in the direction of the air moving means 6. Conveniently, the window 21 may be partially closed by means of a sliding panel 21a while the window 13 is fully or at least more completely open in order to produce a degree of back pressure of cold air in the chamber 10. In some instances it is desirable to reverse the flow of air downward over the spiral, in which case the panel 21a can be adjusted to create back pressure.

In this embodiment of the present invention, it is possible to easily and quickly convert from a fluidized bed operation suitable for freezing small particles of food to a spiral conveyor which is more appropriate to larger pieces of food by the simple expedient of adjusting several window closures and without the need for separate and expensive units heretofore required in the industry. It will further be appreciated that the present invention, by providing access passageways along side each of the respective components, allows access to these components for thorough and rapid maintenance, inspection or cleaning. It will especially be noted that according to the present invention, the refrigeration coils, which are particularly suspectible to collecting food and dirt, are accessible from either side and can be actually removed by sliding from the entire compartment.

Other embodiments which characterize the present invention will be appreciated by having reference to FIG. 3 through 6.

Figure 3:
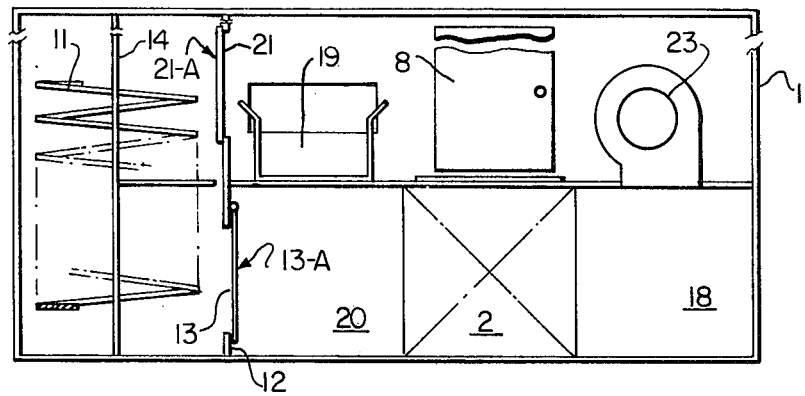
FIG. 3 is a schematic front end view of the device shown in FIG. 1 but employing blowers rather than fans.
Figure 6:
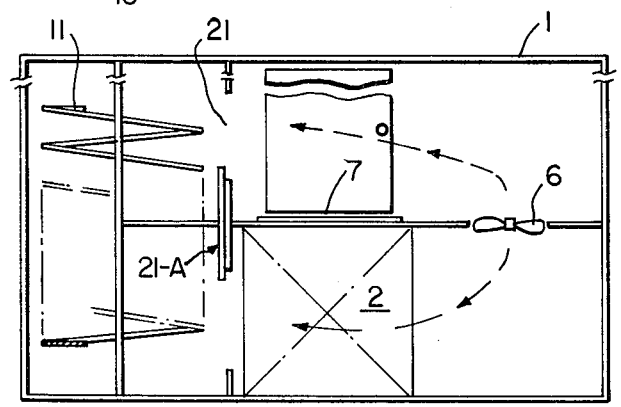
FIG. 6 is a schematic front end view showing the embodiment of the present invention wherein a fan is employed whose direction can be changed to alter the air flow pattern.

FIG. 3 illustrates the embodiment of the present invention wherein the air moving means employed is a blower 23 rather than fans which are shown at 6 in FIGS. 1 and 6. It will also be seen in FIG. 3 that the windows 13 and 21 are closed by means of hinged doors 13a and sliding panel 21a respectively, while the bottom of trough 19 is open thereby directing the force of air of blower 23 across the refrigeration coil 2 upward through passageway 20 into the trough 19 to produce a fluidized bed mode of operation.

In FIG. 4 of the drawings, the spiral conveyor 11 is replaced by a pair of wheeled trolleys 25 having multiple tiered trays upon which the food to be frozen is placed. In this embodiment of the invention, the windows 13 and 21 are opened and the hinge closure 13a for window 13 can be used to close off the fluidized bed trough 19. An additional hinged doorway is provided at 24 for access to the refrigeration coil 2.

In FIG. 5 of the drawings, multiple cascade type conveyors are depicted at 27. The upper most of the moving conveyor belts is loaded at one end of the device and conveys the food in a horizontal direction to the other end where it falls to the next lower belt, ultimately ending on the lowest belt from which it is removed. During the period of this transit the cold air introduced through window 13 produces freezing in the same manner as described with respect to the spiral conveyor and tiered trolley described heretofore.

In FIG. 6 the blower 23 shown in FIGS. 3, 4, and 5 is replaced by an axial fan or series of axial fans whose direction can be changed to produce a flow of air either downward through the passageway 18 and directly across the refrigeration coil 2 or in the opposite direction so that the air flow returns across the refrigeration coil. In either mode of operation, it is desirable, as previously noted, to maintain a somewhat smaller closure on the downstream side of chamger 10 in order to produce some back pressure in the freezing compartment. The relative size of the upstream and downstream closures can be adjusted conveniently by moving the sliding panel 21a upward or downward over the respective openings. FIG. 6 also illustrates the embodiment of the present invention in which the food conveying means is located in the compartment directly alongside the refrigeration coils.

It will be appreciated and understood that the present invention differs primarily from the prior art in the respective alignment of the three principal air moving, refrigeration and food conveying components. The relative disposition of these units according to the present invention has the unique advantage of providing ease of access and interchangeability of the components while at the same time permitting a degree of flexibility of use which has not heretofore been possible. Thus, with the present invention, fans and blowers can interchangeably be employed along with any of the four major food conveying means which are commonly employed in the art to handle the various type of food and other products which are to be frozen.

I claim:

1. An apparatus for freezing articles which is adaptable to variable modes of operation, said apparatus having plural compartments on upper and lower levels and comprising air moving means, refrigeration means and first and second means for receiving and maintaining the articles being frozen while they are in said device; said refrigeration means being disposed in a first compartment on said lower level and having second and third compartments disposed on either side thereof; said air moving means being disposed on the upper level over said second compartment; said first means for receiving and maintaining said articles being disposed in a fourth compartment adjacent said third compartment and in a position to receive refrigerated air passing through said third compartment from said refrigeration means; said second means for receiving and maintaining said articles being disposed in a fifth compartment on said upper level over said third compartment and also in a position to receive refrigerated air passing through said third compartment from said refrigeration means; and means for selectively regulating and controlling the flow of refrigerated air into and out of said fourth and fifth compartments.

2. The apparatus of claim 1 in which said air moving means are blowers.

3. The apparatus of claim 1 in which said air moving means are fans.

4. The apparatus of claim 1 wherein said second means for receiving and maintaining articles is an elongated means for maintaining a moving, fluidized bed of said articles while receiving a flow of refrigerated air upward from said second vacant compartment.

5. The apparatus of claim 1 wherein said first means for receiving and maintaining articles is selected from the group consisting of moving conveyors and stationary tray.

6. The apparatus of claim 1 wherein said air moving means is reversible to provide either a clockwise or counter-clockwise flow of air through the respective compartments of the apparatus.

7. The apparatus of claim 1 wherein said air control means is closure means for alternatively restricting or terminating the flow of refrigerated air to either said fourth or fifth compartments.

8. An apparatus for freezing articles, said apparatus having plural compartments on upper and lower levels and comprising air moving means, refrigeration means and means for receiving and maintaining the articles being frozen while they are in said device; said refrigeration means being disposed in a first compartment on said lower level and having second and third compartments disposed either side thereof; said air moving means being disposed on the upper level over said second compartment; said means for receiving and maintaining said articles being disposed in said third compartment in a position to receive refrigerated air passing through said compartment from said refrigeration means; and means for controlling and regulating the flow of refrigerated air into and out of said third compartment.

9. The apparatus of claim 8 wherein said air moving means is reversible to provide either a clockwise or counter-clockwise flow of air through the compartment of the apparatus.

10. The apparatus of claim 8 wherein said means for controlling and regulating the flow of air is a vertical partition disposed between said first and third compartments and extending through said upper and lower levels, said partition being provided with respective adjustable openings in both the upper and lower level portion thereof.

* * * * *